US009527409B2

(12) United States Patent
Uebelacker et al.

(10) Patent No.: US 9,527,409 B2
(45) Date of Patent: *Dec. 27, 2016

(54) VEHICLE SEAT AND UTILITY MOTOR VEHICLE COMPRISING A VEHICLE SEAT

(71) Applicant: GRAMMER AG, Amberg (DE)

(72) Inventors: Roland Uebelacker, Pfreimd (DE); Erwin Haller, Birgland (DE); Ralph Nuss, Poppenricht (DE); Gerhard Delling, Schmidgaden (DE)

(73) Assignee: GRAMMER AG, Amberg (DE)

( * ) Notice: Subject to any disclaimer, the term of this patent is extended or adjusted under 35 U.S.C. 154(b) by 156 days.

This patent is subject to a terminal disclaimer.

(21) Appl. No.: 14/278,127

(22) Filed: May 15, 2014

(65) Prior Publication Data

US 2015/0015045 A1 Jan. 15, 2015

(30) Foreign Application Priority Data

Jun. 26, 2013 (DE) .......................... 10 2013 106 718
Sep. 20, 2013 (DE) .......................... 10 2013 110 445

(51) Int. Cl.
*B60N 2/22* (2006.01)
*B60N 2/48* (2006.01)
(Continued)

(52) U.S. Cl.
CPC ............... *B60N 2/2222* (2013.01); *B60N 2/38* (2013.01); *B60N 2/4867* (2013.01); *B60N 2002/0216* (2013.01); *B60N 2002/0288* (2013.01)

(58) Field of Classification Search
CPC ....... B60N 2/2222; B60N 2/38; B60N 2/4867; B60N 2002/0216; B60N 2002/0288; B60N 2002/0204; B60N 2002/0212
(Continued)

(56) References Cited

U.S. PATENT DOCUMENTS

| 769,495 A | 9/1904 | Schroeder |
| 937,343 A | 10/1909 | Wallace |

(Continued)

FOREIGN PATENT DOCUMENTS

| AT | 321497 | 4/1975 |
| DE | 1796557 | 9/1959 |

(Continued)

OTHER PUBLICATIONS

Official Action (no English translation available) for German Patent Application No. 12194557.0, dated Jan. 29, 2015, 5 pages.
(Continued)

*Primary Examiner* — Jose V Chen
(74) *Attorney, Agent, or Firm* — Sheridan Ross P.C.

(57) ABSTRACT

A vehicle seat, in particular a utility motor vehicle seat, having a seat part, having a backrest comprising a lower backrest part and an upper backrest part, and having a holding device, by means of which the upper backrest part is mounted displaceably with respect to the lower backrest part, wherein the holding device has a sliding guide device, by means of which the upper backrest part is arranged displaceably with respect to the lower backrest part along a displacement curve so as to mount the upper backrest part displaceably at least in part past the side edge of the lower backrest part.

8 Claims, 8 Drawing Sheets

(51) Int. Cl.
  *B60N 2/38* (2006.01)
  *B60N 2/02* (2006.01)

(58) Field of Classification Search
  USPC .................. 297/406, 407, 303, 353, 383
  See application file for complete search history.

(56) References Cited

U.S. PATENT DOCUMENTS

| | | | |
|---|---|---|---|
| 1,257,427 | A | 2/1918 | Underwood |
| 2,219,799 | A | 10/1940 | Zuck et al. |
| 2,306,334 | A | 12/1942 | Costas |
| 2,777,531 | A | 1/1957 | Erickson |
| 2,835,311 | A | 5/1958 | Reeves et al. |
| 3,300,249 | A | 1/1967 | Schneider |
| 3,342,528 | A * | 9/1967 | Radke .................. A47C 7/48 297/284.1 |
| 3,348,880 | A | 10/1967 | Swann |
| 3,393,938 | A | 7/1968 | Meyer et al. |
| 3,888,329 | A | 6/1975 | Monaghan |
| 4,108,493 | A | 8/1978 | Naus |
| 4,195,882 | A | 4/1980 | Daswick |
| 4,634,176 | A | 1/1987 | Scott |
| 4,679,854 | A | 7/1987 | Putsch et al. |
| 5,108,150 | A | 4/1992 | Stas |
| 5,154,477 | A | 10/1992 | Lacy |
| 5,211,696 | A | 5/1993 | Lacy |
| 5,308,028 | A | 5/1994 | Kornberg |
| 5,547,247 | A | 8/1996 | Dixon |
| 5,567,015 | A | 10/1996 | Arias |
| 5,803,542 | A | 9/1998 | Insausti |
| 6,079,784 | A | 6/2000 | Peachey |
| 6,224,149 | B1 | 5/2001 | Gevaert |
| 6,305,749 | B1 | 10/2001 | O'Connor et al. |
| 6,513,781 | B1 | 2/2003 | Meyer et al. |
| 6,648,416 | B2 | 11/2003 | O'Connor et al. |
| 6,893,095 | B2 | 5/2005 | Schambre et al. |
| 6,942,297 | B2 | 9/2005 | Johnson |
| 7,178,874 | B2 | 2/2007 | Demski |
| 7,210,735 | B2 | 5/2007 | Lang |
| 7,640,090 | B2 | 12/2009 | Uchida et al. |
| 7,780,237 | B2 | 8/2010 | Chen et al. |
| 7,931,331 | B2 | 4/2011 | Gomes et al. |
| 8,007,045 | B2 | 8/2011 | Meiller et al. |
| 8,794,705 | B2 | 8/2014 | Steinmetz et al. |
| 9,221,362 | B2 * | 12/2015 | Schneider .................. B60N 2/2209 |
| 9,283,871 | B2 * | 3/2016 | Uebelacker .................. B60N 2/4867 |
| 2001/0000639 | A1 | 5/2001 | Park et al. |
| 2003/0155797 | A1 | 8/2003 | Amirault et al. |
| 2003/0178880 | A1 | 9/2003 | Hannah |
| 2005/0194827 | A1 | 9/2005 | Dowty et al. |
| 2013/0134753 | A1 | 5/2013 | Buehlmeyer et al. |
| 2013/0175837 | A1 | 7/2013 | Buehlmeyer et al. |
| 2013/0181500 | A1 | 7/2013 | Buehlmeyer et al. |

FOREIGN PATENT DOCUMENTS

| | | |
|---|---|---|
| DE | 7228055 | 11/1972 |
| DE | 2551617 | 6/1977 |
| DE | 2644485 | 4/1978 |
| DE | 3046049 | 7/1982 |
| DE | 4126518 | 2/1993 |
| DE | 4215628 | 11/1993 |
| DE | 4405397 | 3/1995 |
| DE | 19937378 | 7/2000 |
| DE | 19920220 | 11/2000 |
| DE | 20307102 | 10/2003 |
| DE | 69913203 | 9/2004 |
| DE | 19628861 | 6/2005 |
| DE | 102004007043 | 6/2005 |
| DE | 102004052604 | 4/2006 |
| DE | 60116924 | 11/2006 |
| DE | 102006028453 | 12/2007 |
| DE | 102007044319 | 7/2008 |
| DE | 102007012133 | 9/2008 |
| DE | 202007016357 | 3/2009 |
| DE | 102010009526 | 8/2011 |
| DE | 102011055895 | 6/2013 |
| EP | 0729867 | 9/1996 |
| EP | 0972671 | 1/2000 |
| EP | 2599658 | 6/2013 |
| EP | 2599659 | 6/2013 |
| FR | 2748432 | 11/1997 |
| FR | 2895336 | 6/2007 |
| FR | 2927855 | 8/2009 |
| FR | 2929185 | 10/2009 |
| FR | 2930208 | 10/2009 |
| FR | 2932429 | 12/2009 |
| GB | 2277869 | 11/1994 |
| GB | 2453165 | 4/2009 |
| GB | 2472836 | 2/2011 |
| WO | WO 03/068556 | 8/2003 |
| WO | WO 2011/020919 | 2/2011 |

OTHER PUBLICATIONS

European Search Report for European Patent Application No. 14163934.4, mailed Oct. 28, 2014, 6 pages.
Official Action (no English translation available) for German Patent Application No. 102013106721.2 dated Mar. 11, 2014, 3 pages.
Official Action for U.S. Appl. No. 13/686,337, mailed Dec. 2, 2014, 12 pages.
Notice of Allowance for U.S. Appl. No. 13/686,409 mailed Nov. 28, 2014, 8 pages.
Official Action for U.S. Appl. No. 13/691,055, mailed Sep. 19, 2014, 9 pages.
Examination Report for German Patent Application No. 102010018822.0, dated Jan. 31, 2013, 3 pages.
Examination Report for German Patent Application No. 102011055895.0, dated Feb. 29, 2012, 3 pages.
Examination Report for German Patent Application No. 102011055895.0, dated Oct. 2, 2012, 3 pages.
Extended European Search Report for European Patent Application No. 12194405.2, mailed Feb. 8, 2013, 3 pages.
Extended European Search Report for European Patent Application No. 12194557, mailed Feb. 7, 2013, 3 pages.
Examination Report for German Patent Application No. 102011055897.7, dated Feb. 27, 2012, 3 pages.
Official Action for German Patent Application No. 102012104184.9 dated Jan. 21, 2013, 3 pages.
Official Action for U.S. Appl. No. 13/686,409 mailed Apr. 24, 2014, 12 pages.
Official Action for U.S. Appl. No. 13/686,337 mailed Apr. 24, 2014, 11 pages.
Official Action (no English translation available) for German Patent Application No. 102013110445.2 dated Mar. 10, 2014, 3 pages.
Official Action (no English translation available) for German Patent Application No. 102013110448.7 dated Mar. 10, 2014, 3 pages.
Official Action (no English translation available) for German Patent Application No. 102013110416.9 dated Mar. 7, 2014, 3 pages.
Notice of Allowance for U.S. Appl. No. 13/686,337, mailed Apr. 24, 2015, 9 pages.
Final Action for U.S. Appl. No. 13/691,055, mailed Feb. 24, 2015, 9 pages.
Official Action for U.S. Appl. No. 13/691,055, mailed Jun. 3, 2015, 8 pages.
Official Action for U.S. Appl. No. 14/278,190, mailed May 22, 2015, 8 pages.
Official Action for U.S. Appl. No. 14/314,519, mailed Jun. 25, 2015, 9 pages.
Notice of Allowance for U.S. Appl. No. 13/691,055, mailed Nov. 12, 2015, 9 pages.
Final Action for U.S. Appl. No. 14/278,190, mailed Oct. 29, 2015, 8 pages.
Notice of Allowance for U.S. Appl. No. 14/314,519, mailed Oct. 15, 2015, 5 pages.
Examination Report for German Patent Application No. 102011055897.7, dated Jul. 25, 2014, 8 pages.

(56) References Cited

OTHER PUBLICATIONS

Extended European Search Report for European Patent Application No. 14163935.1, dated Oct. 30, 2014, 6 pages.
Official Action (with English translation) for Chinese Patent Application No. 2012104992473, dated Nov. 3, 2014, 13 pages.
Official Action (with English translation) for Chinese Patent Application No. 201210489228, dated Dec. 1, 2014, 29 pages.

* cited by examiner

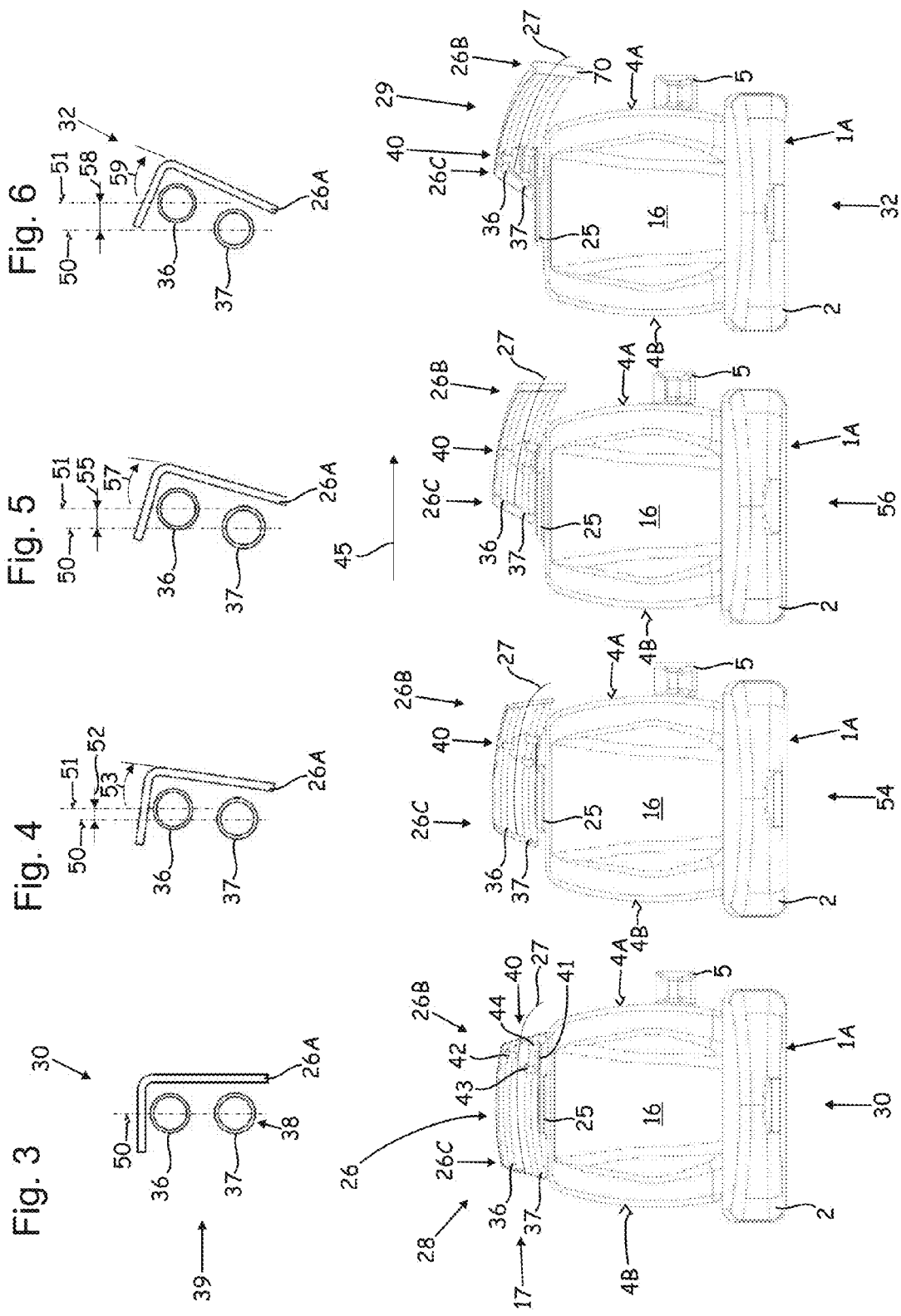

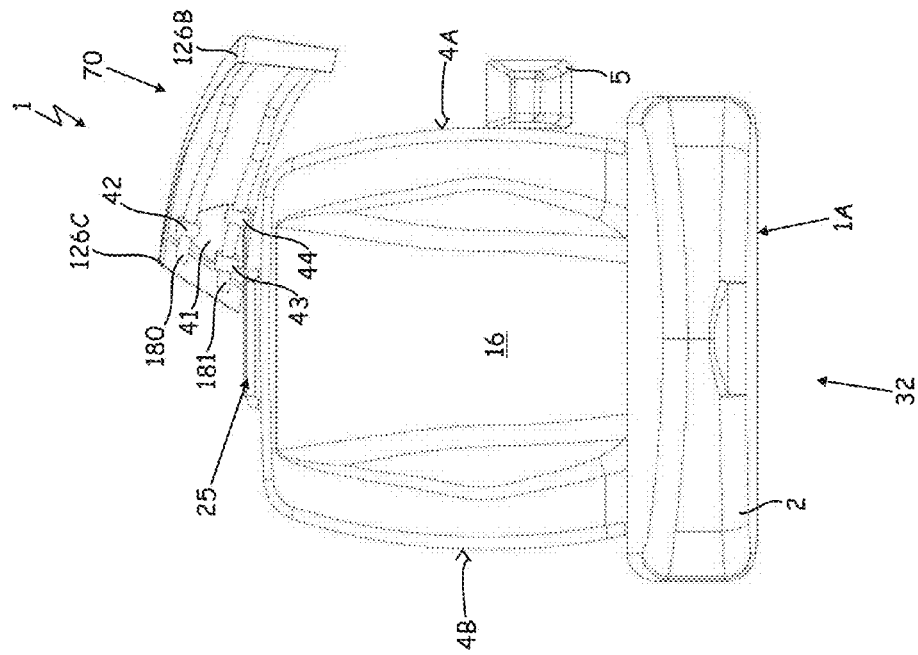
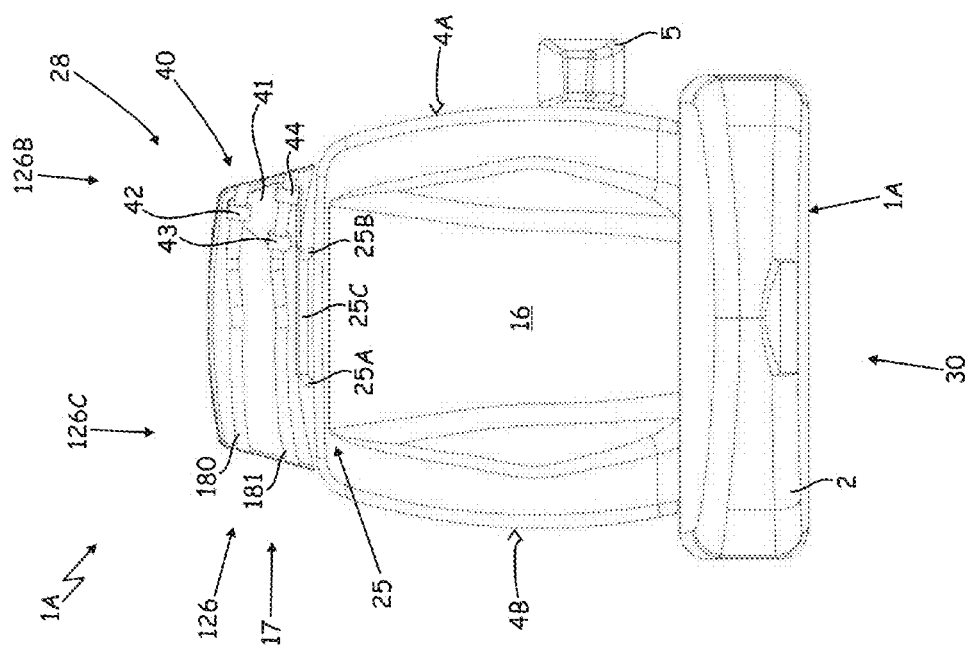
Fig. 7
Fig. 8

VEHICLE SEAT AND UTILITY MOTOR VEHICLE COMPRISING A VEHICLE SEAT

CROSS-REFERENCE TO RELATED APPLICATIONS

This application claims the benefit of German Patent Application No. 10 2013 106 718.2 filed Jun. 26, 2013 and German Patent Application No. 10 2013 110 445.2 filed Sep. 20, 2013, the entire disclosures of each of which are incorporated herein by reference.

FIELD

The invention relates to a vehicle seat, in particular a utility motor vehicle seat, having a seat part, having a backrest comprising a lower backrest part and an upper backrest part, and having a holding device, by means of which the upper backrest part is mounted displaceably with respect to the lower backrest part. The invention further relates to a utility motor vehicle, in particular an agricultural utility motor vehicle, comprising at least one vehicle seat.

BACKGROUND

Numerous conventional vehicle seats, in particular for utility motor vehicles and specifically for agricultural utility motor vehicles, are in various manners well-known from the art.

In particular drivers of agricultural utility motor vehicles, during their work with these agricultural utility motor vehicles and the working equipment attached thereto, often take up a further, laterally or rearwardly orientated seated working posture—differing from the normal vehicle seat stance which is orientated forwards, in other words in the direction of travel—over a relatively long period, for example so as to be better able to reach and operate operating elements located at the side rear in the vehicle cabin, or else merely so as to be better able to observe working equipment which is attached behind the agricultural utility motor vehicle for a relatively long period.

So as to give the driver easier operating access to rearwardly located operating elements in this laterally or rearwardly orientated seated working posture, or merely so as to be better able to see or observe a rear operating region behind a vehicle seat, Offenlegungsschrift DE 30 46 049 A1 discloses a vehicle seat in which the backrest is divided at least in two, and in this context accordingly has an upper backrest part and a lower backrest part, at least the upper backrest part being pivotable about a vertical axis. As a result, the driver can at any time turn his/her torso or respectively upper body, for example so as to reach the operating elements positioned behind the vehicle seat, since the upper backrest part can rotate about this vertical axis. In this context, the driver can indeed reach backwards past the lower backrest part without difficulty, since the upper backrest part is rotated about the vertical axis; however, with this solution the driver has very unsatisfactory support, or none at all, for his/her upper body in a corresponding laterally or rearwardly orientated seated working posture. The driver is thus not significantly supported by the upper backrest part.

In another, more recent solution, drivers can intermittently rotate the entire vehicle seat, in other words substantially the entire rigid seat construction including the seat part and the backrest, about a defined vertical axis of rotation by means of a rotation adapter, so as to be better able to reach a rear space within the vehicle cabin or respectively observe a rear space outside the vehicle cabin. In this context, the seat part remains stationary with respect to the backrest as a whole. Any accessories on the vehicle seat, for example a multifunctional armrest, thus rotate together with respect thereto. However, operating levers which are arranged further back to the side in the vehicle cabin still cannot be actuated comfortably as a result.

This last solution further results in the driver having to turn himself/herself out of a comfortable seat cushion contour of the vehicle seat, so as in particular to be able to continue operating the pedals of the agricultural utility motor vehicle reasonably reliably. This in turn can lead to pressure points and thus to discomfort especially in the driver's buttocks and thigh region.

Specifically the back cushion contour is currently formed in such a way that the driver is supported as much as possible in the forwardly directed vehicle seat stance, without depriving him/her of the necessary degree of freedom which he requires for his movements in driving operation. So as not to obstruct freedom of movement in the shoulder/arm region, the back cushion of the backrest must not be too contoured in the upper region. However, so as to ensure good support and thus sufficiently good load relief for the driver, a support surface should always be as large as possible in all driving positions. For the aforementioned reasons, such as the required degrees of freedom for good movement, this can currently only be achieved under some conditions and thus in an unsatisfactory manner, since the driver is alternating between two extremely different driving positions.

A further major drawback is that the possible pivot range of the rotary adapter is limited because, even when the rear operating equipment is being observed, the utility motor vehicle still has to be controlled safely via the pedals and the steering wheel. To meet these demands, the driver often has to assume a constrained posture, which inevitably leads to critical torsion of his/her whole body, over a relatively long period. Scientific studies additionally show that a constrained posture of this type can lead to damage to body structures in particular when vibrations are applied, especially if the body is not sufficiently well supported. It is further established that the load on the spinal column can be reduced significantly by good support via the backrest part.

SUMMARY

An object of the invention is to offer a driver improved seat comfort, especially when he has to take up a constrained posture of this type, so that he/she is able to drive an agricultural utility motor vehicle reliably and in particular in a safe manner. In addition, a further object of the invention is to protect the driver from premature fatigue when taking up this constrained posture.

The object of the invention is achieved by a vehicle seat, in particular by a utility motor vehicle seat, having a seat part, having a backrest comprising a lower backrest part and an upper backrest part, and having a holding device, by means of which the upper backrest part is mounted displaceably with respect to the lower backrest part, the vehicle seat being characterized in that the holding device comprises a sliding guide device, by means of which the upper backrest part is arranged displaceably with respect to the lower backrest part along a displacement curve so as to mount the upper backrest part displaceably at least in part past the side edge of the lower backrest part.

The present sliding guide device is particularly suitable for ensuring low-wear and thus also lasting play-free mounting of the upper backrest part, by means of which mounting even large support forces can be received and transmitted. This is particularly important for strong impact loads, which occur frequently in particular in utility motor vehicles used for agricultural purposes.

In particular if a utility motor vehicle seat is equipped with a sliding guide device of this type, it is possible for the driver to be supported particularly well in a rearwardly directed constrained posture, without the upper backrest part of the backrest blocking his/her access to operating elements located behind the vehicle seat or respectively his/her view of working equipment being towed by the utility motor vehicle.

In contrast with the solutions known from the art, by means of the upper backrest part the driver's torso can now advantageously additionally be supported in the event of a laterally or rearwardly directed constrained posture, resulting in particularly advantageous relief of the driver's body structures or respectively torso structures, in such a way that premature fatigue can also be prevented and thus the efficiency of work can also be increased.

The upper backrest part can be understood to be an extension of the backrest, however, not as a separate head support, and if necessary as containing an integrated head support.

By means of the sliding guide device according to the invention, it is possible in a constructionally particularly simple manner to shift the upper backrest part from a parked position, which is placed directly above the lower backrest part and is preferably in the centre of the backrest, and into a support position located to the side of the backrest, so as to make additional driver torso support possible there.

So as to be able to achieve a wide range of effects in relation to the sliding guide device, said device may be configured in a variety of ways, as is explained further in the following.

However, at this point individual terms should firstly be addressed, as well as the function of the additional driver torso support with regard to how it can be achieved using the slidably mounted upper backrest part.

Within the meaning of the invention, the term "seat part" denotes the region of the vehicle seat on which the buttocks of the driver are placed. The seat part thus forms a corresponding seat surface by way of seat part cushion elements.

Accordingly, the term "backrest" describes a region of the vehicle seat on which the driver can support himself/herself, basically via his/her back, while he/she is sitting on the seat part. The backrest accordingly extends upwards past the seat part from the rear end of the seat part.

In this context, the backrest is divided into an upper backrest part and a lower backrest part, the upper backrest part being mounted displaceably with respect to the lower backrest part, and thus also with respect to the seat part, by means of the sliding guide device.

The lower backrest part is preferably arranged on the vehicle seat so as to be stationary with respect to the seat part. However, this is not absolutely compulsory. The lower backrest part thus forms a part of the backrest which is stationary with respect to the seat part.

The upper backrest part thus forms a part of the backrest which is laterally displaceable with respect to the seat part.

The holding device is provided for this purpose, which is ideally attached directly to the lower backrest part, so as to be able to shift the upper backrest part along a displacement curve with respect to this lower backrest part. However, with a configuration of this type of the vehicle seat, it is also possible for this holding device to be provided in another region of the backrest or respectively on a frame of the vehicle seat. Alternatively, this holding device may also be provided on the body side of the respective utility motor vehicle, so as to be able to mount the upper backrest part linearly displaceably in this manner with respect to the lower backrest part.

In any case with the present upper backrest part within the meaning of the invention, an additional driver torso support device, which can be arranged outside the seat part and the backrest, can be provided so as to support the driver in the constrained posture with respect to a laterally or rearwardly orientated seated working posture.

Accordingly, a considerable improvement in seat comfort is achieved with this upper backrest part which is guided in accordance with the invention.

On the other hand, the driver is also further protected from premature fatigue, in particular if he/she has to visually monitor the rear region of the utility motor vehicle over a long period. In this way in particular, the risk of accident is greatly reduced and work safety is thus increased.

The upper backrest part and respectively the driver torso support device incorporated thereby can be arranged temporarily at least in part in a support region, which is otherwise free from vehicle seat, at the level of the region of the upper half of the backrest and laterally off-centre from the backrest, in such a way that the driver sitting on the vehicle seat is supported laterally off-centre from the backrest at least at the level of his shoulder and/or ribcage region during a laterally or rearwardly orientated seated working posture, the additional driver torso support device being arranged displaceably from the parked position into an additional support position, in the support region which is otherwise free from vehicle seat, using a displacement device.

In the present case, the displacement device is the sliding guide device.

Advantageously, the load on the driver can be relieved extremely well by the additional driver torso support device arranged in this manner while assuming a constrained posture, in particular the above-described laterally or rearwardly orientated seated working position. Also, the additional driver torso support device is available, although preferably only when it is required. Otherwise, for example in a forwardly orientated driving position, the additional driver torso support device does not interfere, since it remains in the idle position or respectively original parked position thereof.

Advantageously, the additional driver torso support device and thus also the upper backrest part can be arranged in such a way that the driver sitting on the vehicle seat is supported at least at the level of his shoulder and/or ribcage region, laterally off-centre from the backrest, during a laterally or rearwardly orientated seated working posture.

Within the meaning of the invention, the term "additional driver torso support device" describes a device for additional torso support for the driver during a constrained posture on the vehicle seat. The constructional implementation of this additional driver torso support device can be achieved in a particularly simple manner using the upper backrest part disclosed herein, in such a way that for a constructional configuration of this type the two terms can be used synonymously.

In the present context, the term "torso" anatomically describes the central region of the human body, and the torso comprises the ribcage, the stomach, the back as well as the pelvis of the human body.

It is thus advantageous if the additional driver torso support device comprises a contact surface for the driver's back and/or shoulder region, the contact surface advantageously being shaped ergonomically so as to correspond particularly well to the anatomy of the human body. First, this means that the driver will accept frequent use of an additional torso support of this type. At the same time, the body of the driver is protected from injuries particularly well by a contact surface of this type, since conditions are often very rough, specifically when working in the fields with agricultural utility vehicles, and in this context the driver is grateful for any targeted torso support.

However, not only a contact surface shaped in this manner is advantageous. Rather, it is even better to place this contact surface so that it is also correctly orientated in the space. This is possible in a surprisingly constructionally simple and particularly effective manner with the present sliding guide device, as explained in detail in connection with the upper backrest part.

Within the meaning of the invention, the term "torso support region which is free from vehicle seat" describes a region of the vehicle seat in which permanent support devices of the vehicle seat cannot reasonably be arranged permanently, since they would have too great a disruptive effect on the driver in normal driving operation.

In this context, the present torso support region which is free from vehicle seat is positioned on the one hand substantially in the upper third of the backrest, in other words above half the height of the backrest and thus often also in the direct lateral or respectively rearward viewing region of the driver. It may further also extend above the upper third. This already means that this torso support region which is free from vehicle seat absolutely has to be kept free at least in normal forward driving operation. Accordingly, it should not be confused with a conventional support region. On the other hand, the torso support region which is free from vehicle seat within the meaning of the invention is located off-centre from the backrest. This already means that it cannot be confused with a conventional support region in which a head support is placed. This is partly because the torso support region which is free from vehicle seat is additionally arranged in front of the backrest or a backrest cushion element and to the side thereof. Thus, the present torso support region which is free from vehicle seat is also provided above and to the side of the seat part of the vehicle seat.

Herein, the description "laterally or rearwardly orientated seated working posture" refers to a constrained posture of the driver in terms of an upper body rotation, so as to be better able to observe a rearward working region in particular behind the agricultural utility vehicle.

At this point, it should be noted that the present vehicle seat according to the invention can not only be used advantageously in relation to a driver. Rather, the vehicle seat according to the invention can be used in virtually any field of application in which an additional torso support is to be provided at least temporarily in the vicinity of the vehicle seat.

The additional driver torso support device can be displaced particularly stably from the parked position into the additional torso support position if the displacement device comprises means for translational displacement of the additional driver torso support device, as is the case for the present sliding guide device with respect to the upper backrest part.

A variant configuration which is particularly advantageous in this connection provides that the sliding guide device is configured in such a way that the upper backrest part additionally rotates about the displacement curve and/or about a transverse axis transverse to the displacement curve during the lateral displacement.

The present driver torso support is achieved not only in that the upper backrest part is linearly displaceable along the displacement curve laterally past at least one of the side edges of the lower backrest part, but also in that the upper backrest part additionally further rotates about this displacement axis, causing the upper backrest part also to be inclined rearwards, meaning that in particular a support surface for the driver's torso is positioned orientated unusually well in a support region which is otherwise free from vehicle seat.

This support surface can be configured particularly well with backrest cushion parts which are correspondingly provided on the upper backrest part, these backrest cushion parts thus being displaceable together with the upper backrest part.

Correspondingly, it will be appreciated that the upper backrest part, but also the lower backrest part, may each have cushion parts for cushioning the backrest as a whole, these cushion parts accordingly being arranged displaceably with respect to one another.

In addition or alternatively, the upper backrest part rotates about a transverse axis extending transversely to the longitudinal displacement axis during the lateral displacement thereof, meaning that the upper backrest part can additionally further be inclined downwards about this transverse axis with respect to the lateral extension of the upper backrest part, meaning that the support comfort for the driver can be improved even further.

The lateral extension of the upper backrest part is substantially flush with the vehicle lateral extension, when the upper backrest part is located in the parked position thereof.

The transverse axis is basically a horizontal axis which is arranged transversely to the displacement curve.

In this context, the displacement curve ideally extends transversely to the primary seating direction inherent to the vehicle seat, the primary seating direction normally extending in the direction of the vehicle longitudinal extension. The upper backrest part can thus be displaced into a lateral region of the vehicle seat, and can thus advantageously be repositioned if necessary in such a way that the driver can turn or respectively bend his/her shoulder/arm region past the lower backrest part, where the upper backrest part was previously still arranged in the parked position thereof, and nevertheless still be supported in the upper region of his back by the upper backrest part which has been displaced into the support position.

The displacement curve may be a physical shaft component or an imaginary axis outside one or more components or an assembly.

It is thus advantageous if the displacement curve is arranged extending transversely to the primary seating direction of the vehicle seat.

Herein, the displacement curve ideally extends in the primary displacement direction in which the upper backrest part is laterally displaced past the side edge of the lower backrest part.

The above-described movement sequence of the upper backrest part can be constructionally implemented in a particularly simple manner if the sliding guide device is configured helically at least in part.

For example, the linear guide device comprises one or more sliding guide elements for this purpose, which are arranged extending helically, in other words in a screw shape, around the displacement curve, in such a way that the upper backrest part can rotate about this displacement curve in a constructionally simple manner in the case of a corresponding linear displacement.

The upper backrest part is thus advantageously mounted rotatably about the displacement curve as a function of a linear displacement in this case.

Herein, within the meaning of the invention, the term "sliding guide elements" refers to elongate guide elements which are mounted on sliding bodies.

It will be appreciated that helical sliding guide elements of this type can be constructionally implemented in various ways, so as to configure the linear guide device helically at least in part. For example, a guide element of this type equipped with guide grooves and/or guide webs is twisted on itself along the displacement curve.

It has been found in practice tests that the holding device and in particular the sliding guide device thereof can absorb very large driver torso support forces if the sliding guide device comprises two sliding guide elements arranged above and at a distance from one another, one of the sliding guide elements being positioned differently from the other sliding guide elements on the path of the displacement curve.

In other words, one sliding guide element is arranged at least in part in a different position from the other sliding guide element in the direction of the displacement curve.

In this context, the first sliding guide element forms a first curved path and the second sliding guide element forms a second curved path, said paths being arranged at least in part with a varying axial offset from one another. The two sliding guide elements are thus arranged in a stationary manner with respect to one another with a varying axial offset. As a result, the two curved paths are arranged skewed with respect to one another at least in regions.

Within the meaning of the invention, the term "sliding guide elements" describes elongate sliding elements which are mounted so as to be displaceably guided using corresponding bearing means. It is clearly also possible to provide more than two sliding guide elements of this type, meaning that the stability of the linear sliding guide device can be increased; however, this also correspondingly complicates the constructional complexity.

If the two sliding guide elements, arranged side by side but at a distance, are arranged or respectively orientated with a progression of this type with respect to one another, an axial offset in relation to these two sliding guide elements can be achieved in a constructionally particularly simple manner, meaning that the upper backrest part can be inclined about the displacement curve within the meaning of the invention during the lateral displacement.

A linear displacement of this type of the upper backrest part may for example be provided pneumatically or hydraulically using corresponding pneumatic or respectively hydraulic cylinder elements.

However, a mechanism of a particularly simple construction in relation to the sliding guide device can be achieved if the displacement takes place manually, optionally still with the mechanical assistance of one or more spring elements.

In any case, it is advantageous for the sliding guide device to comprise at least one sliding guide element which is slidably guided in a sliding bearing element.

It will be appreciated that corresponding sliding guide elements may be provided in virtually any desired configuration and arrangement on the sliding guide device.

Sliding bearing elements configured in a manner corresponding to the sliding guide elements may also accordingly be provided in virtually any desired configuration and arrangement on the sliding guide device.

In order for it to be possible to displace the upper backrest part for example manually using only a low displacement force, it is advantageous for the at least one sliding guide element to comprise a slide bush having a reduced sliding surface as a result of material recesses on the sliding inner surface thereof.

If the at least one sliding guide element comprises resilient support arm elements or fixed bearing webs which form a slide bush, the bearing behaviour of the sliding guide element relative to the sliding bearing element can be modified to specific uses or respectively customers.

In addition, it is advantageous for the sliding guide device to comprise a sliding bearing element holder, by means of which at least two sliding bearing elements are held above one another.

If the sliding guide device in particular comprises a single sliding bearing element holder in which all the sliding bearing elements are arranged inside the upper backrest part, the sliding guide device can be particularly compact.

The present sliding guide device can thus be integrated into the vehicle seat in a particularly compact construction if the sliding guide device comprises rod and/or tube sliding elements which are arranged inside the upper backrest part.

Ideally, these rod and/or tube sliding elements are fully integrated into the upper backrest part; however, with a corresponding configuration they may also be arranged only partially inside the upper backrest part.

In any case, the upper backrest part can be displaced along the displacement curve by means of these rod and/or tube sliding elements, in such a way that the upper backrest part can be displaced at least in part into the torso support region which is otherwise free from vehicle seat.

Advantageously, the rod and/or tube sliding elements are arranged inside the upper backrest part in such a way that they are displaced together with the upper backrest part so as to configure the displacement curve at least in part. As a result, it can be ensured that during displacement the rod and/or tube sliding elements are displaced completely, together with the upper backrest part, into the torso support region which is otherwise free from vehicle seat, in such a way that a region free from components can be created on the vehicle seat above the lower backrest part, in the upper region of the backrest.

So as to be able to guide elements of this type reliably, it is advantageous if the sliding guide device comprises sliding bearing elements which are arranged on the lower backrest part and on which rod and/or tube sliding elements are guided in a transverse manner to the primary seating direction.

At this point, it should be noted that sliding bearing elements of this type need not necessarily be attached to the lower backrest part. Rather, with a corresponding configuration, they may also be arranged in other regions of the backrest or on a frame arranged alongside the vehicle seat or the like.

Advantageously, these roller elements are arranged in a stationary manner on the lower backrest part, in such a way that a particularly simple construction of a holding device configured or respectively equipped with the sliding guide device can be implemented.

Further, an advantageous variant configuration provides that the sliding guide device has a displacement curve which is bent at least once, preferably repeatedly.

For example, a displacement curve which is only bent once is already sufficient to displace the upper backrest part into a support position which is positioned below, above, in front of or behind the central parked position of the upper backrest part.

However, if the displacement curve is bent repeatedly, the upper backrest part can undergo a manifold change in spatial position along the displacement curve, making it possible for example to curve around obstacles or the like.

So as also for example to be able to circumvent any further obstacles which may be present on the path between the central parked position and the additional support position of the upper backrest part, it is thus advantageous if the sliding guide device comprises a repeatedly bent displacement curve.

It will be appreciated that the present upper backrest part as a whole can only configure an upper sub-region of the backrest per se.

However, it is also possible for the upper backrest part merely to be a backrest cushion element which is linearly displaceable accordingly along a displacement curve by means of the sliding guide device, laterally at least past a side edge of the lower backrest part, a frame or respectively framework of the backrest being stationary in particular with respect to the seat part, in such a way that merely the backrest cushion element is displaced from the central parked position into the off-centre additional support position.

In any case, in both embodiments the upper backrest part comprises backrest cushion elements by means of which the support surface described above can be configured.

It is further possible for the upper backrest part additionally to be subdivided in the direction of the lateral extension thereof, in such a way that the backrest part is not displaced along the displacement curve as a whole, but only a first upper backrest part half, this first upper backrest part half being spatially separated from a second upper backrest part half of the upper backrest part by a vertical gap.

In any case, a variant configuration which is no less advantageous provides that the backrest parts which extend past the backrest are equipped with backrest cushion elements which are located in front of the backrest parts in the seating direction, a first backrest cushion element being a lower backrest cushion element which is stationary with respect to the seat part in the lateral direction, and a further backrest cushion element being arranged above the first backrest cushion element in the region of the upper backrest part, the upper backrest part being configured as an additional driver torso support device which can be arranged outside the seat part and the backrest and which can temporarily be arranged at least in part in a support region which is otherwise free from vehicle seat at the level of the region of the upper backrest part and laterally off-centre from the backrest, in such a way that the driver sitting on the vehicle seat is supported laterally off-centre from the backrest at least at the level of his shoulder and/or ribcage region during a laterally or rearwardly directed seated working posture, the additional driver torso support device being arranged displaceably from a central parked position into an additional support position in the support region which is otherwise free from vehicle seat by means of a displacement device.

In the present case, the displacement device is the sliding guide device, as mentioned previously.

The object of the invention is also further achieved by a utility motor vehicle, in particular by an agricultural utility motor vehicle, comprising at least one vehicle seat, in which the utility motor vehicle or respectively the agricultural utility motor vehicle is equipped with a vehicle seat in accordance with one of the features disclosed herein or respectively in accordance with one of the feature combinations disclosed herein.

If the utility motor vehicle, in particular the agricultural utility motor vehicle, comprises the vehicle seat according to the invention, additional torso support can be provided specifically for the driver during working operation, in particular when driving in fields or on other unsurfaced routes, meaning that the driver is much better protected, as is also described repeatedly in detail above.

Further advantages, aims and properties of the present invention are described by way of the appended drawings and the following description, in which a vehicle seat is illustrated and described by way of example using differently configured sliding guide devices.

In this context, components or respectively regions of the vehicle seat which are configured with an equivalent construction in the individual drawings are denoted using like reference numerals, the components or respectively regions not necessarily being numbered and described in all of the drawings. Thus, only significantly altered components or respectively regions, in particular in terms of the possible sliding guide devices shown by way of example, are provided with new reference numerals.

The sliding guide device may be formed as a linear sliding guide device and the displacement curve may be formed as a linear displacement axis.

BRIEF DESCRIPTION OF THE DRAWINGS

FIG. 3 is a first schematic detail of a first possible sliding guide device of the upper backrest part in an initial position, in which two curved sliding guide elements, arranged above and at a distance from one another, are mounted extending in a skewed manner with respect to one another at least in part on sliding bearing element holders;

FIG. 4 is a second schematic detail of the first possible sliding guide device in a side position displaced laterally further out, in which the two sliding guide elements already have a first axial offset at the level of the sliding bearing element holders;

FIG. 5 is a further schematic detail of the first possible sliding guide device in a side position displaced laterally even further out, in which the two sliding guide elements have a greater axial offset at the level of the sliding bearing element holders;

FIG. 6 is a final schematic detail of the first possible sliding guide device in an end position, in which the two sliding guide elements have a maximum axial offset at the level of the sliding bearing element holders;

FIG. 7 is a schematic detail of a further possible sliding guide device of the upper backrest part in an initial position, in which two sliding guide elements, arranged above and at a distance from one another and extending in a skewed manner with respect to one another at least in part, are curved repeatedly;

FIG. 8 is a further schematic detail of the sliding guide device of FIG. 7 in an end position in which the upper backrest part is located in a support position;

DETAILED DESCRIPTION

Figure 1A:
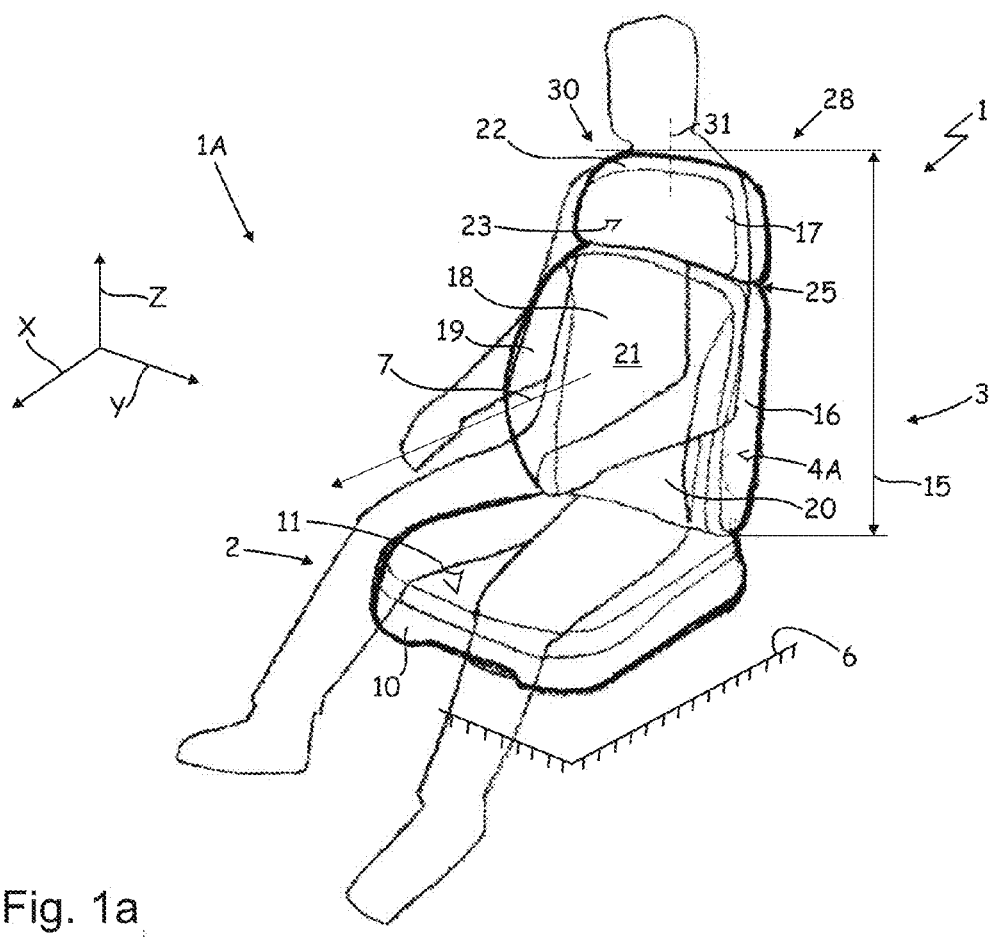
FIGS. 1a and 1b are schematic perspective views of a utility motor vehicle seat in a normal operating condition, in which the upper backrest part is arranged in a parked position centrally above the lower backrest part.
Figure 1B:
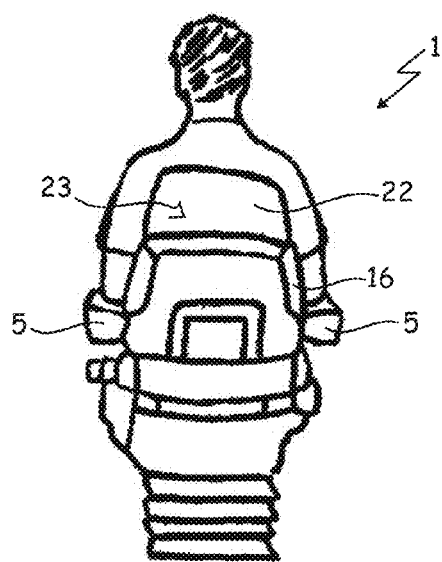

The vehicle seat 1 shown in FIGS. 1 to 8 is a utility motor vehicle seat 1A which comprises a seat part 2 and a backrest 3, an armrest 5 further being provided on the backrest 3 at the right side edge 4A.

The seat part 2 of the utility motor vehicle seat 1A is attached to a body (not shown) of a utility motor vehicle 6 by means of a lower vehicle seat part (not shown).

The utility motor vehicle 6 defines a vehicle longitudinal extension X, a vehicle lateral extension Y and a vehicle vertical extension Z, which may also be used in relation to the orientation of the utility motor vehicle seat 1A.

Thus, using the vehicle longitudinal extension X, a position or respectively change in position "in front of" or "behind" the backrest 3 can be defined.

Using the vehicle lateral extension Y, a position or respectively change in position "laterally" or "to the side" with respect to the backrest 3 can be defined.

Accordingly, using the vehicle vertical extension Z, a position or respectively change in position "upwards" or "downwards" with respect to the backrest 3 can also be defined.

In this context, the utility motor vehicle seat 1A is arranged in the utility motor vehicle 6 in such a way that the primary seating direction 7 of the utility motor vehicle seat 1A is substantially flush with the vehicle longitudinal extension X.

The seat part 2 comprises a seat part cushion element 10 which configures the actual seat part surface 11 of the seat part 2.

The situation is similar as regards the backrest 3, the backrest 3 being subdivided over the overall height 15 thereof into a lower backrest part 16 and an upper backrest part 17. The overall height 15 extends substantially in the direction of the vehicle vertical extension Z.

In this context, the lower backrest part 16 comprises a lower part cushion element 18 having outer cheek regions 19 and 20, in such a way that the lower backrest part 16 as a whole configures an in particular highly contoured lower part surface 21.

Accordingly, the upper backrest part 17 comprises an upper part cushion element 22, although this configures an in particular smooth upper part surface 23.

The utility motor vehicle seat 1A further comprises a holding device 25 (see in particular FIGS. 2a and 2b onwards), by means of which the upper backrest part 17 is mounted displaceably on the backrest 3 with respect to the lower backrest part 16.

In this context, the holding device 25 is releasably fixed in holding sockets (not shown) formed correspondingly in the lower backrest part 16 by way of holding bracket elements 25A and 25B (merely shown schematically), which are rigidly interconnected by a holding plate element 25C.

This holding device 25 configured in this way comprises the sliding guide device 26 according to the invention (see FIG. 3 onwards), which is configured in such a way that the upper backrest part 17 is linearly displaceable laterally along an imaginary displacement curve 27 past at least one side edge 4 of the lower backrest part 16 or respectively of the backrest 3, whilst the lower backrest part 16 is stationary with respect to the seat part 2.

The upper backrest part 17 thus forms the part of the backrest 3 which is laterally displaceable with respect to the seat part 2, whilst the lower backrest part 16 forms the part of the backrest 3 which is stationary with respect to the seat part 2.

Figure 2A:
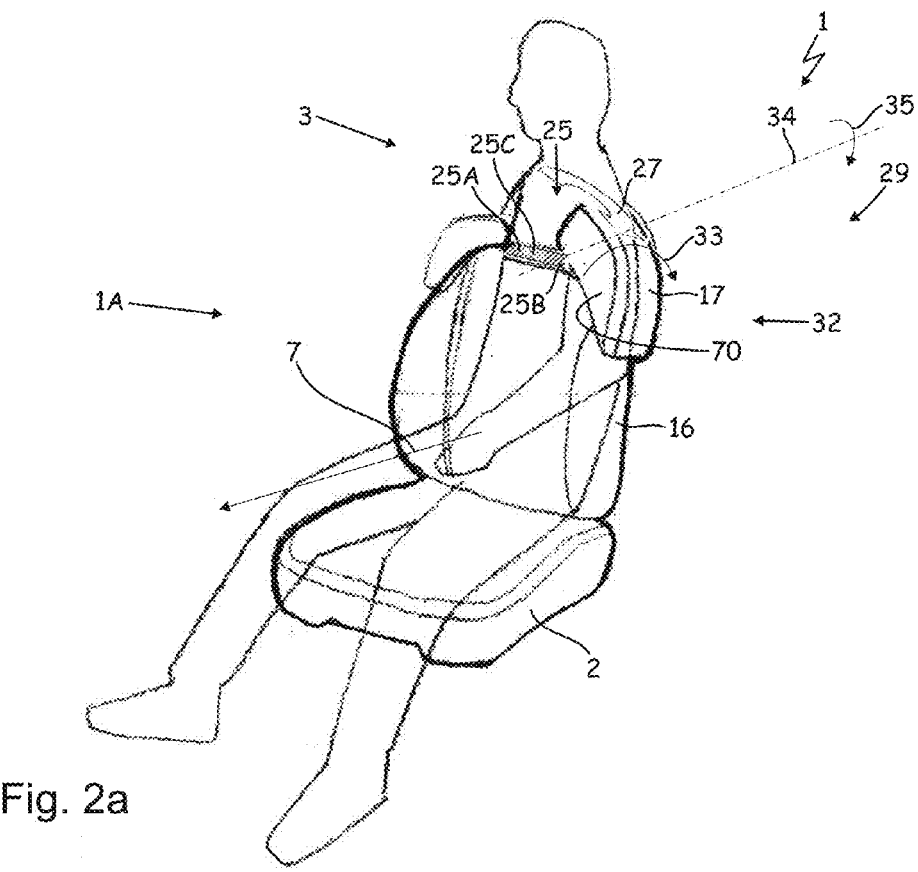
FIGS. 2a and 2b are further schematic views of the utility motor vehicle seat in a special support operating condition, in which the upper backrest part is arranged displaced laterally off-centre from the lower backrest part in a support position.
Figure 2B:
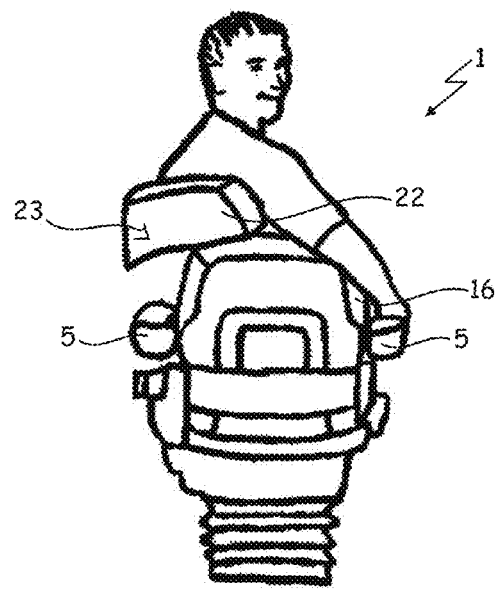

As a result, the upper backrest part 17 can be displaced or slid from a central parked position 28 (see FIG. 1a, 1b, 3 and also 7) along the displacement curve 27 into an off-centre support position 29 (see FIG. 2a, 2b, 6 and also 8).

Since the overall height 15 extends in the direction of the vehicle vertical extension Z, it is clear that the upper backrest part 17 is positioned completely over the lower backrest part 16, in other words above the lower backrest part 16, at least in the central parked position 28, in such a way that the driver can comfortably take his/her place on the utility motor vehicle seat 1A in the primary seating direction 7 in this normal operating condition.

In this context, the imaginary displacement curve 27 extends transversely to the primary seating direction 7 or respectively to the vehicle longitudinal extension X. The imaginary displacement curve 27 thus extends substantially in the vehicle lateral extension Y.

In the central parked position 28 of the upper backrest part 17, the sliding guide device 26 or respectively corresponding components thereof are located in an initial position 30 (see also FIGS. 3 and 7).

This central parked position 28 and respectively this initial position 30 are defined in that, on the one hand, the upper backrest part 17 and respectively, on the other hand, the sliding guide device 26 are located centrally with respect to a vertical central axis 31 of the backrest 3. The vertical central axis 31 extends substantially in the direction of the vehicle vertical extension Z. The central parked position 28 is thus located centrally between the two side edges 4A and 4B.

With respect to the off-centre support position 29 of the upper backrest part 17, the sliding guide device 26 is located in a laterally off-centre end position 32 (see in particular FIGS. 2a, 2b and 6), this laterally off-centre end position 32 being located to the right side beside the vertical central axis 31 and thus also at least in part beside the right side of the right side wall 4A of the lower backrest part 16.

It will be appreciated that for a sliding guide device 26 configured in this manner the laterally off-centre end position 32 may also be arranged to the left side beside the vertical central axis 31 and thus also at least in part to the left side beside the left side wall 4B of the lower backrest part 16.

In this embodiment, the sliding guide device 26 is accommodated completely inside the upper backrest part 17 or respectively is covered at least in part by the upper backrest part 17, so that it is also not explicitly shown in the drawings of FIGS. 1a, 1b and 2a, 2b.

By means of the sliding guide device 26 according to the invention, the upper backrest part 17 can not only be displaced linearly past the right side edge 4A of the lower backrest part 16, but can further also be inclined rearwards with respect to the backrest 3 or respectively downwards with respect to the backrest 3 when the upper backrest part 17 is displaced along the imaginary displacement curve 27.

Thus, the upper backrest part 17 can thus additionally be rotated about the imaginary displacement curve 27 in a first inclination direction 33 and/or rotated in a second inclination direction 35 about a transverse axis 34 extending in a transverse manner to the displacement curve 27 during the lateral displacement.

So as to implement a multiply inclined change in position of the upper backrest part 17 in a constructionally simple manner, in such a way that the sliding guide device 26 can be integrated compactly and ideally completely into the upper backrest part 17, the sliding guide device 26 is configured helically at least in part.

In this specific first embodiment, the effect of a helically configured sliding guide device 26 is achieved in a constructionally simple manner in that the sliding guide device 26 comprises two sliding guide elements 36 and 37, arranged side by side and at a distance from one another, in the form of tube sliding elements 38 (here numbered merely by way of example), the two sliding guide elements 36 and 37 being arranged skewed with respect to one another at least in part if they do not extend mutually parallel in regions.

In other words, one of the sliding guide elements 36 and respectively 37 is arranged differently in the path of the imaginary displacement curve 27 with respect to the other of the sliding guide elements 36 and respectively 37 inside a housing element 26A of the sliding guide device 26 (see in particular FIG. 3 onwards).

In this embodiment, the two sliding guide elements 36 and 37 are thus arranged mutually parallel at a first end 26B of the sliding guide device 26, whilst they are arranged extending skewed with respect to one another towards a second end 26C, as can be seen particularly clearly in the individual sectional drawings 39 of the respective upper partial drawings of FIGS. 3 to 6.

In this context, the two sliding guide elements 36 and 37 define the imaginary displacement curve 27 which herein is imagined to extend between the two sliding guide elements 36 and 37.

In this context, the sliding guide elements 36 and 37 are configured curved in such a way that the imaginary displacement curve 27 is curved once, meaning that the upper backrest part 17 follows a curved path when it is displaced along the imaginary displacement curve 27 which is bent once.

As well as the two sliding guide elements 36 and 37, the sliding guide device 26 also further comprises a holding device 40, which is attached to the holding device 25 of the utility motor vehicle seat 1A.

More precisely, this holding device 40 is attached to the holding plate element 25C so as to be stationary.

Figure 9:
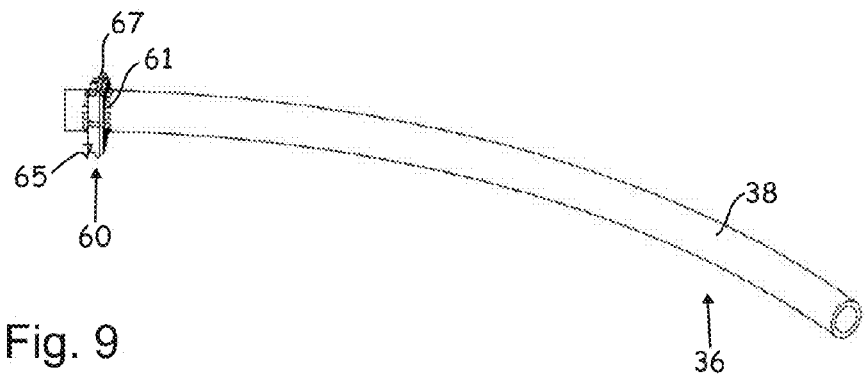
FIG. 9 is a schematic view of a tube sliding element, which is mounted in a sliding bearing element and is curved by way of example, of the sliding guide device from FIGS. 1 to 6.
Figure 10:
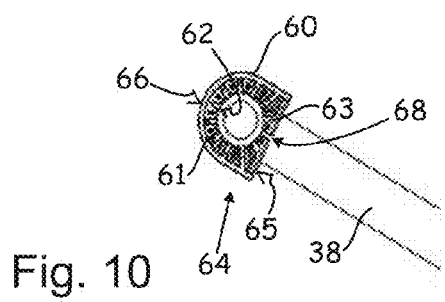
FIG. 10 is a schematic detail of the sliding mounting between the curved tube sliding element and the sliding bearing element from FIG. 9.

In this embodiment, this holding device 40 consists of a holding sheet metal element 41 configured in a delta shape, to which three sliding bearing element holders 42, 43 and 44 for mounting sliding bearing elements 60 in the form of bearing bushes 64 are attached in turn (see for example FIGS. 9 and 10).

In this context, the holding sheet metal element 41 configured in a delta shape is materially connected, preferably welded, to the holding plate element 25C. An equivalent connection may also alternatively be based on a screw or rivet connection or the like.

In this embodiment, the holding device 40 is thus rigidly connected to the holding device 25. Likewise, the three sliding bearing element holders 42, 43 and 44 are fixed to the holding sheet metal element 41 of the holding device 40 so as to be stationary. Overall, this results in robust and durable attachment of the upper backrest part 17 with respect to the lower backrest part 16.

By means of the holding sheet metal element 41 configured in a delta shape, the holding device 40 can be constructed more compactly as a whole, and it is further possible for the first sliding guide element 36 merely to be operatively connected to the first sliding bearing element holder 42 and for the second sliding guide element 37 to be operatively connected both to the second sliding bearing element holder 43 and to the third sliding bearing element holder 44 in such a way that the two sliding guide elements 36 and 37 can be slidably displaced along the imaginary displacement curve 27 in the displacement direction 45 within the sliding bearing element 60 of the sliding bearing element holder 42 or respectively 43 and 44 in accordance with the invention.

Advantageously, these sliding bearing element holders 42, 43 and 44 are configured in such a way that they are arranged on the lower backrest part 16 by means of the holding sheet metal element 41 of the holding device 40 and the holding device 25, and on which the sliding guide elements 36 and 37 configured as tube sliding elements 38 are simultaneously guided in a transverse manner to the primary seating direction 7 in the direction of the imaginary displacement curve 27.

In FIG. 3, the sliding guide device 26 is still located in the initial position 30 (cf. FIGS. 1a, 1b), in which the upper backrest part 17 is located in the central parked position 28. As can be seen particularly clearly from the upper sectional drawing 39 of FIG. 3 at the height of the holding device 40, the two sliding guide elements 36 and 37 are arranged mutually parallel jointly centrally together in a vertical plane 50 in the region of the first end 26B of the sliding guide device 26. The upper backrest part 17 is thus not yet arranged inclined rearwards or respectively downwards within the meaning of the invention.

However, in the further progression of the two sliding guide elements 36 and 37 towards the second end 26B of the sliding guide device 26, the first sliding guide element 36 is already no longer arranged centrally in the shared vertical plane 50 together with the second sliding guide element 37, but is instead arranged centrally in a vertical parallel plane 51, in such a way that there is a first axial offset 52 between the two sliding guide elements 36 and 37, as can be seen particularly clearly from the upper sectional drawing 39 of FIG. 4 at the holding means 40.

Since the two sliding guide elements 36 and 37 are installed fixedly in the housing element 26A, this has the effect that the upper backrest part 17 is inclined rearwards at a first angle of inclination 53 in the first inclination direction 33 (see FIG. 2a, 2b) when the upper backrest part 17 is moved laterally along the imaginary displacement curve 27 in the displacement direction 45 (cf. FIG. 4). At the same time, in this first intermediate position 54, the upper backrest part 17 is inclined downwards in the second inclination direction 35 about the transverse axis 34 as a result of the somewhat obliquely arranged holding device 40 and the curvature of the sliding guide elements 36 and 37 (see also FIG. 2).

This effect is reinforced as the upper backrest part 17 is moved further towards the off-centre support position 29 thereof or respectively the sliding guide device 26 is moved into the end position 32 thereof (see FIG. 6), since the axial offset between the two sliding guide elements 36 and 37 constantly increases during the progression towards the second end 26B, as is illustrated particularly clearly for example in FIG. 5 with a relatively large axial offset 55.

Accordingly, in this second intermediate position 56, the first angle of inclination 53 also increases to a larger angle of inclination 57 (see sectional drawing 39, FIG. 5) and this continues until the two sliding guide elements 36 and 37 are displaced through the corresponding sliding bearing element holders 42, 43 and 44 to the second end 26B thereof in the displacement direction 45 and the sliding guide device 26 is finally located in the end position 32 thereof and respectively the upper backrest part 17 is finally located in the off-centre support position 29 thereof.

In this end position 32, a maximum axial offset 58 and accordingly a maximum angle of inclination 59 can thus be made use of so as to be able to use the upper backrest part 17 completely as an additional support surface, as a maximally slid-out and correspondingly positioned driver torso support device 70.

As soon as it has been displaced in particular completely into the off-centre support position 29 thereof (cf. FIGS. 2a, 2b and 6), the upper backrest part 17 can thus also act completely as an additional driver torso support device 70, correspondingly increasing the seat comfort of the driver.

Whereas in relation to the first embodiment the two sliding guide elements 36 and 37 still have a single curvature in the form of tube sliding elements 28 in relation to the first sliding guide device 26 shown in detail in FIGS. 3 to 4, in this further embodiment corresponding round rod elements 180 and 181 of an alternative sliding guide device 126 shown in FIGS. 7 and 8 are multiply curved, in such a way that the upper backrest part 17 can follow a multiply curved imaginary displacement curve (not explicitly shown here). As a result, it is advantageously optionally possible for the upper backrest part 17 also to circumvent obstacles (not shown) during displacement between the central parked position 28 (see FIG. 7) and the off-centre support position 29 (see FIG. 8).

Otherwise, the utility motor vehicle seat 1A shown in FIGS. 7 and 8 corresponds to the construction described previously in FIGS. 1 and 6, so that reference is made to the relevant description for the avoidance of repetition.

The bent tube sliding element 38 shown by way of example in FIGS. 9 and 10 is one of the sliding guide elements 36 or 37. The tube sliding element 38 is displaceably slidably mounted in a sliding bearing element 60 (and this can also be the other way round), so that round guide mounting is produced thereby.

Each sliding bearing element 60 of this type is each pressed into one of the above-described sliding bearing element holders 42, 43, and 44.

In this context, the sliding bearing element 60 is equipped with individual resilient support arm elements 61, which are arranged concentrically around the tube sliding element 38. As a result, on the one hand the risk of the tube sliding element 38 tilting inside the sliding bearing element 60 is reduced, whereby the upper backrest part 17 can be displaced along the imaginary displacement curve 27 more easily and reliably.

As a result of these individual resilient support arm elements 61, the sliding bearing element 60 is also advantageously only in operative contact with the tube sliding element 38 over a reduced contact surface 62, whereby the friction between these two components is reduced. This has the additional advantage that the tube sliding element 38 can be more easily moved relative to the sliding bearing element 60. In particular, a starting resistance is reduced hereby so that the upper backrest part 17 can be more easily set in motion, and this in particular makes it easier to manually operate the upper backrest part 17.

In this context, the individual support arm elements 61 are spaced apart from one another concentrically about the tube sliding element 38 by material recesses 63 on the sliding bearing element 60 and thus form a corresponding sliding bearing bush 64.

Moreover, the sliding bearing element 60 has a varying peripheral geometry when viewed in the peripheral direction, it having a straight peripheral side region 65 and a bent peripheral side region 66.

A spring element 67 is provided on the bent peripheral side region 66 which can correspond with a groove on the sliding bearing element holder 42, 43 or 44 if the sliding bearing element 60 is inserted into a corresponding bearing seat (not shown here).

An assembly slot 68 is further provided on the straight peripheral side region 65 in order for it to be possible to more easily insert the sliding bearing element 60 into the bearing seat or respectively remove said element from the bearing seat during assembly or dismantling.

Figure 11:
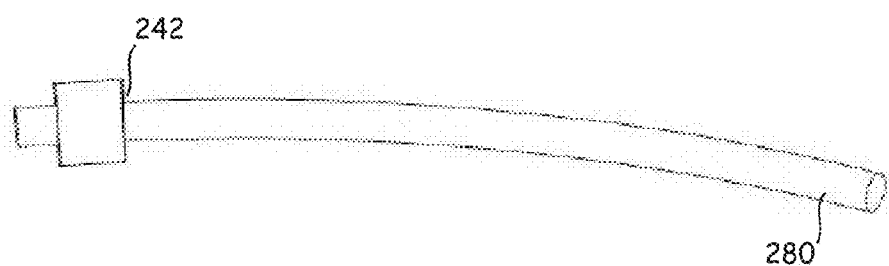
FIG. 11 is a schematic view of a round rod sliding element which is curved by way of example and comprises an alternative sliding bearing element holder.
Figure 12:
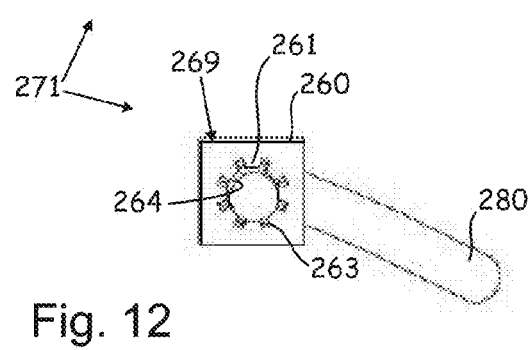
FIG. 12 is a schematic detail of the sliding mounting between the curved round rod sliding element and the sliding bearing element from FIG. 11.

In the alternative assembly 271 shown in FIGS. 11 and 12, a round rod sliding element 280 which is bent once and is made of a solid material is mounted in another sliding bearing element 260 which is held in a sliding bearing element holder 242, whereby round guide mounting can be ensured.

The sliding bearing element 260 comprises a square, plate-shaped base body 269 which forms a sliding bearing bush 264 in the centre, the plate-shaped base body 269 comprising, on the sliding bearing bush 264, a plurality of material recesses 263 provided concentrically on the sliding bearing bush 264, so that the sliding bearing element 260 also comprises individual resilient support arm elements 261. On the one hand, on the sliding bearing element 260, resilient mounting of the round rod sliding element 280 which is bent once is achieved as well as on the other hand a friction-surface reduction is achieved, as already explained above.

Figure 13:
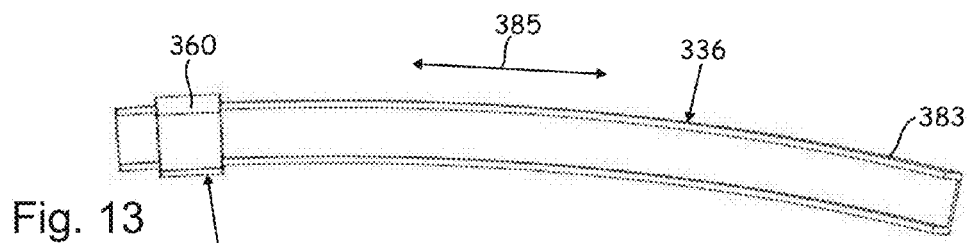
FIG. 13 is a schematic view of a U-shaped profiled sliding element which is curved by way of example and comprises a further sliding bearing element.
Figure 14:
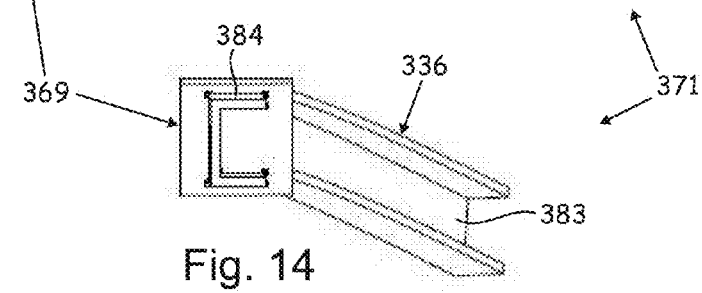
FIG. 14 is a schematic detail of the sliding mounting between the bent U-shaped profiled sliding element and the further sliding bearing element from FIG. 13.

In the further assembly 371 shown in FIGS. 13 and 14, a bent U-shaped profiled sliding element 383 is provided with a correspondingly configured sliding bearing element 360 and accordingly a profiled guide mounting is produced.

Compared with the above-mentioned round guide mounting, a further advantage of this profiled guide mounting is that the U-shaped profiled sliding element 383 is additionally slidably guided in the sliding bearing element 360 with anti-twist protection.

In this context, the sliding bearing element 360 comprises a rectangular base body 369 in which a U-shaped sliding bearing slot 384 is made.

The U-shaped profiled sliding element 383 is twisted on itself along the longitudinal extension 385 thereof, in order for it to be possible to achieve the helical effect described at the outset even using only a single sliding guide element 336 when the upper backrest part 17 is displaced along the displacement curve 27.

In this context, the U-shaped profiled sliding element 383 can be produced from a sheet metal material or from a plastics material.

Figure 15:
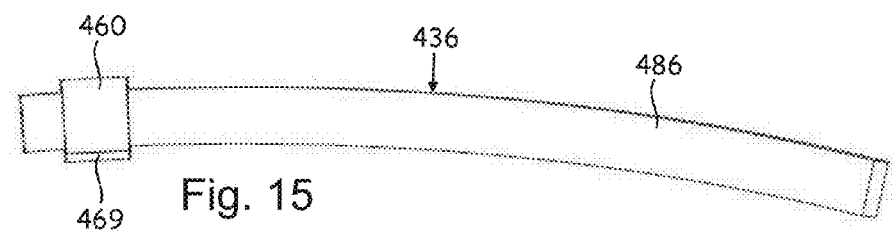
FIG. 15 is a schematic view of a square sliding element which is bent by way of example and comprises an alternative sliding bearing element.
Figure 16:
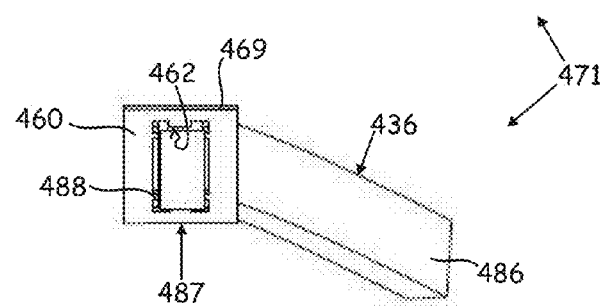
FIG. 16 is a schematic detail of the sliding mounting between the curved square sliding element and the alternative sliding bearing element from FIG. 15.

With respect to the other assembly 471 shown in FIGS. 15 and 16, another sliding guide element 436 formed as a rectangular sliding element 486 and made of a solid material is slidably mounted in an alternative sliding bearing element 460 using a rectangular bearing bush 487, whereby planar guide mounting is produced. The sliding bearing element 460 has a rectangular base body 469.

The rectangular bearing bush 487 is equipped with bearing webs 488 (numbered merely by way of example), which define a reduced contact surface 462 between the rectangular sliding element 486 and the sliding bearing element 460.

As a result of the rectangular bearing bush 487, the rectangular sliding element 486 is slidably guided in the sliding bearing element 460 with anti-twist protection.

The upper backrest part 17 which is shown once more in FIGS. 17 to 20 is, in this further embodiment, slidably mounted relative to the lower backrest part 16 using a further possible sliding guide device 526. More specifically, the sliding guide device 526 is attached directly to the lower backrest part 16 by means of a holding device 525 by two holding bracket elements 525A and 525B. The two holding bracket elements 525A and 525B are interconnected by a holding plate element 525C.

Figure 17:
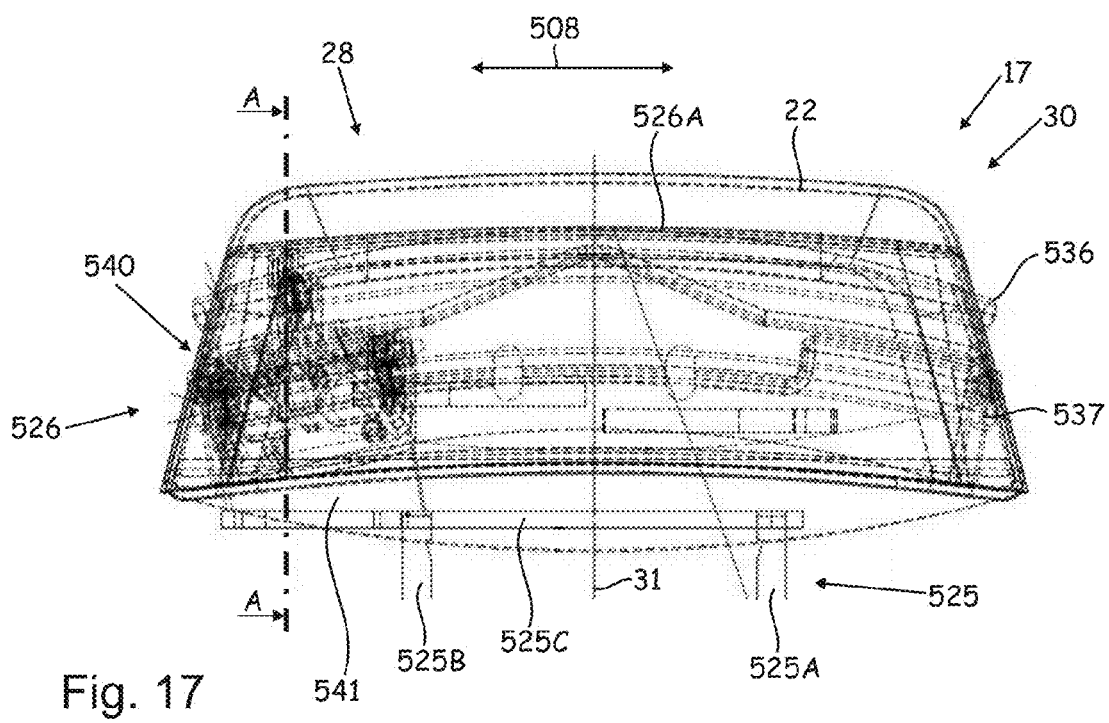
FIG. 17 is a schematic rear view of the upper backrest part (FIGS. 2 to 6) in the central parked position, which part is slidably guided by the sliding guide device.

According to FIG. 17, the upper backrest part 17 is still arranged centrally to the vertical central axis 31 (see also FIG. 1) with respect to the lateral extension 508 thereof, so that the upper backrest part 17 can be placed in a central parked position 28 (see FIG. 1, 3 or 7) above the lower backrest part 16.

Figure 18:
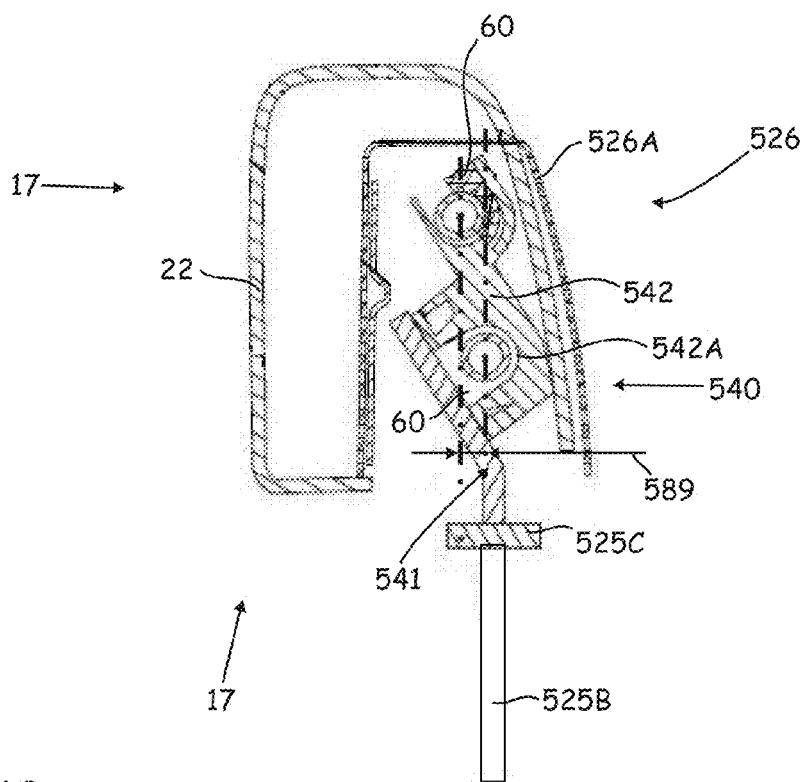
FIG. 18 is a schematic cross-section of the sliding guide device from FIG. 17 along the line A-A.

According to FIG. 18, the upper cushion element 22 of the upper backrest part 17 can be clearly seen, which is arranged in an interlocking manner on a housing element 526A of the sliding guide device 526.

The sliding guide device 526 comprises a holding device 540 which is attached to the top of the holding plate element 525C using a holding sheet metal element 541.

A sliding bearing element holder 542 is also arranged on this holding sheet metal element 541, in which sliding bearing element holder a total of three of the sliding bearing elements 60 shown and described in FIGS. 9 and 10 are inserted into three correspondingly formed bearing seats 542A (numbered merely by way of example).

Two sliding guide elements 536 and 537 are mounted in the sliding bearing elements 60, the sliding guide element 536 merely being slidably displaceably mounted in a single one of the sliding bearing elements 60 and the sliding bearing element 537 being slidably displaceably mounted in the two other sliding bearing elements 60 along the displacement curve 27 (see FIGS. 3 to 6).

In this context, the holding sheet metal element 541 can be arranged so as to be slightly tilted in the sliding guide device 526, so that the two sliding guide elements 536 and 537 are already arranged with a small initial axial offset 589 from one another in the sliding guide device 526 which is in the initial position 30.

Figure 19:
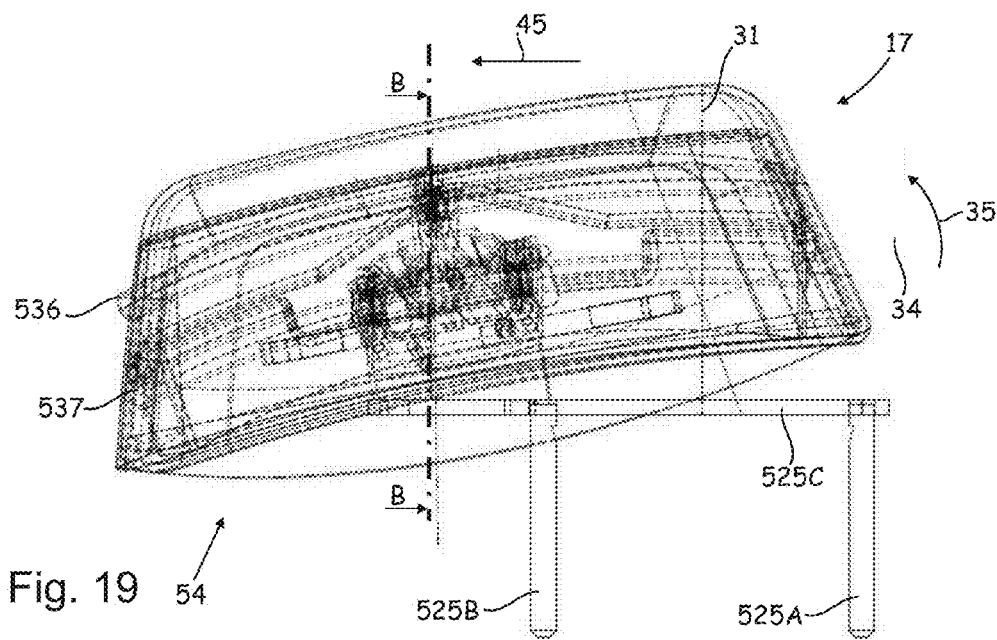
FIG. 19 is a schematic rear view of the upper backrest part or the sliding guide device from FIGS. 17 and 18 half extended out of the central parked position.
Figure 20:
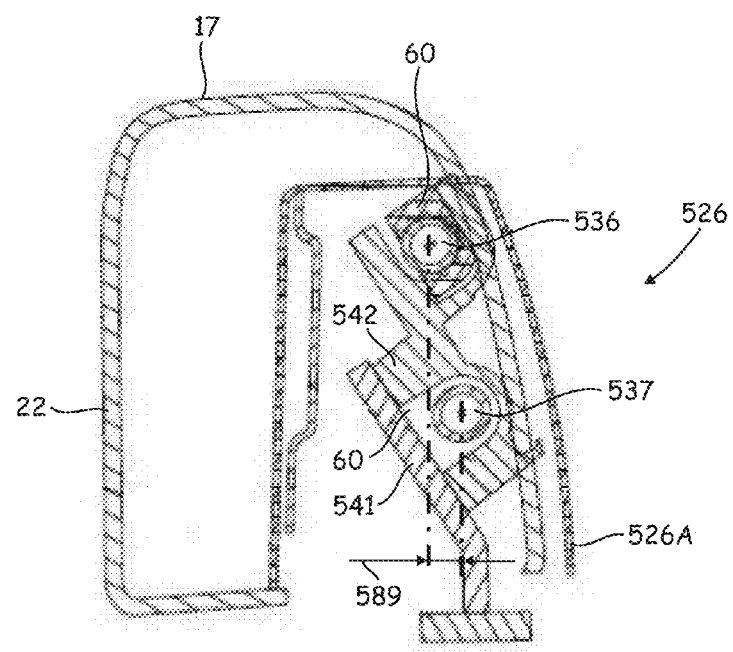
FIG. 20 is a schematic cross-section of the sliding guide device from FIG. 19 along the line B-B.

With respect to the sliding guide device 526 shown in FIGS. 19 and 20, the upper backrest part 17 is already displaced along the displacement curve 27 in the displacement direction 45, the upper backrest part 17 being rotated in the second inclination direction 35 about the transverse axis 34 (see FIG. 2) as a result of the curvature of the two sliding guide elements 536 and 537.

In this first intermediate position 54 (cf. also FIG. 4), the initial axial offset 589 between the two sliding guide elements 536 and 537 remains unchanged. Accordingly, the upper backrest part 17 is not yet inclined in the first inclination direction 33 (cf. FIG. 2).

It will be appreciated that the embodiments described above are merely first configurations of the vehicle seat according to the invention or respectively of sliding guide devices and the components thereof. The configuration of the invention is therefore not limited to these embodiments.

All of the features disclosed in the application documents are claimed as being essential to the invention if they are novel with respect to the prior art individually or in combination.

LIST OF REFERENCE NUMERALS 1 vehicle seat
1A utility vehicle seat
2 seat part
3 backrest
4 right side edge
5 armrest
6 utility motor vehicle
7 primary seating direction
10 seat part cushion element
11 seat part surface
15 overall height
16 lower backrest part
17 upper backrest part
18 lower part cushion element
19 first outer cheek region
20 second outer cheek region
21 contoured lower part surface
22 upper part cushion element
23 smooth surface
25 holding device
25A first holding bracket element
25B second holding bracket element
25C holding plate element
26 sliding guide device
26A housing element
26B first end
26C second end
27 imaginary displacement curve
28 central parked position
29 off-centre support position
30 initial position
30 vertical central axis
32 end position
33 first inclination direction
34 transverse axis 35 second inclination direction
36 first sliding guide element
37 second sliding guide element
38 tube sliding element
39 sectional drawings
40 holding device
41 holding sheet metal element
42 first sliding bearing element holder
43 second sliding bearing element holder
44 third sliding bearing element holder
45 displacement direction
50 shared vertical plane
51 vertical parallel plane
52 first axial offset
53 first angle of inclination
54 first intermediate position
55 larger axial offset
56 second intermediate position
57 larger angle of inclination
58 maximum axial offset
59 maximum angle of inclination
60 sliding bearing element
61 resilient support arm element
62 reduced contact surface
63 material recesses
64 sliding bearing bush
65 straight peripheral side region
66 bent peripheral side region
67 spring element
68 assembly slot
70 driver torso support device
126 alternative linear guide device
126B first end
126C second end
180 first round rod sliding element
181 second round rod sliding element
242 sliding bearing element holder
260 other sliding bearing element
261 resilient support arm element
263 material recesses
264 sliding bearing bush
269 plate-shaped base body
271 assembly
280 round rod sliding element bent once
336 single sliding guide element
371 further assembly
383 U-shaped profiled sliding element
360 sliding bearing element
369 rectangular base body
384 U-shaped sliding bearing slot
385 longitudinal extension
436 other sliding guide element
460 alternative sliding bearing element
462 reduced contact surface
469 rectangular base body
471 other assembly
486 rectangular sliding element
487 rectangular bearing bush
488 bearing webs
508 lateral extension
525 holding device
525A first holding bracket element
525B second holding bracket element
525C holding plate element
526 sliding guide device
526A housing element
536 first sliding guide element
537 second sliding guide element
540 holding device
541 holding sheet metal element
542 first sliding bearing element holder
542A bearing seats

What is claimed is:

1. A vehicle seat, comprising:
a seat part, having a backrest comprising a lower backrest part and an upper backrest part by means of which a driver's torso can be additionally supported, and having a holding device, by means of which the upper backrest part is mounted displaceably with respect to the lower backrest part,
wherein
the holding device has a sliding guide device comprising two sliding guide elements, by means of which the upper backrest part and the two sliding guide elements are arranged displaceably with respect to the lower backrest part along a displacement curve, wherein the displacement curve is defined by the two sliding guide elements so as to mount the upper backrest part displaceably at least in part in the direction of a side edge of the lower backrest part.

2. The vehicle seat according to claim 1,
wherein
the two sliding guide elements are arranged mutually parallel jointly centrally together in a vertical plane in the region of the first end and are not arranged centrally in a shared vertical plane in the region of a second end resulting in that the upper backrest part additionally rotates about the displacement curve and/or about an axis extending at an angle to the displacement curve, preferably about a transverse axis extending transverse to the displacement curve, during a lateral displacement.

3. The vehicle seat according to claim 1,
wherein
the two sliding guide elements are arranged side by side and at a distance from one another, the two sliding guide elements being arranged skewed with respect to one another, at least in part, in a helical configuration.

4. The vehicle seat according to claim 1,
wherein
the sliding guide elements include at least one sliding guide element that is slidably guided in a sliding bearing element.

5. The vehicle seat according to claim 4,
wherein
the at least one sliding bearing element comprises a sliding bearing bush having a reduced sliding surface as a result of material recesses on a sliding inner surface thereof.

6. The vehicle seat according to claim 4,
wherein
the at least one sliding bearing element comprises resilient support arm elements which form a slide bush.

7. The vehicle seat according to claim 1,
further comprising: a sliding bearing element holder, by means of which the at least two sliding bearing elements are held above one another.

8. A utility motor vehicle, in particular an agricultural utility motor vehicle, with at least one vehicle seat, characterised by a vehicle seat according to claim 1.

* * * * *